United States Patent
Kim et al.

(10) Patent No.: US 9,444,607 B2
(45) Date of Patent: *Sep. 13, 2016

(54) METHOD AND APPARATUS FOR PROTECTING A PRIMARY SERVICE IN WLAN SYSTEM

(71) Applicant: LG Electronics Inc., Seoul (KR)

(72) Inventors: Eun Sun Kim, Gyeonggi-do (KR); Yong Ho Seok, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,799

(22) Filed: Jul. 16, 2015

(65) Prior Publication Data

US 2015/0327258 A1    Nov. 12, 2015

Related U.S. Application Data

(63) Continuation of application No. 14/052,603, filed on Oct. 11, 2013, now Pat. No. 9,118,450, which is a continuation of application No. 12/910,186, filed on Oct. 22, 2010, now Pat. No. 8,588,158.

(Continued)

(51) Int. Cl.
*H04W 4/00* (2009.01)
*H04L 5/00* (2006.01)

(Continued)

(52) U.S. Cl.
CPC .......... *H04L 5/0085* (2013.01); *H04W 72/048* (2013.01); *H04W 72/0426* (2013.01); *H04W 72/0453* (2013.01); *H04W 16/14* (2013.01); *H04W 84/12* (2013.01)

(58) Field of Classification Search
None
See application file for complete search history.

(56) References Cited

U.S. PATENT DOCUMENTS 5,276,908 A   1/1994  Koohgoli et al.
5,774,805 A   6/1998  Zicker
(Continued)

FOREIGN PATENT DOCUMENTS

CN    1221542 A    6/1999
CN    1561647      1/2005
(Continued)

OTHER PUBLICATIONS

USPTO Office Action dated Mar. 7, 2014 in related technology U.S. Appl. No. 12/908,449. Note: U.S. Pub. 2010/0124254, 2007/0047492, and 2009/0323835 cited therein are already of record.

(Continued)

*Primary Examiner* — Kouroush Mohebbi
(74) *Attorney, Agent, or Firm* — Morgan, Lewis & Bockius LLP

(57) ABSTRACT

A method and an apparatus for protecting a primary service as an unlicensed device in a regulatory domain where a licensed device and the unlicensed device are permitted to operate are disclosed. For protecting a primary service by a station as an unlicensed device in a regulatory domain where a licensed device and the unlicensed device are permitted to operate, the unlicensed device acquires a list of identified available channels for the operation of the unlicensed device and maximum allowed transmission powers of the identified available channels from a regulatory domain database system; generates a white space map (WSM) comprising the list of identified available channels and the maximum allowed transmission powers of the identified available channels; updates the WSM when the station acquires information that a primary service signal is detected on a specific channel which is indicated as available in the WSM; and transmits the updated WSM to another station such that the another station moves to another channel if the another station is operating on the specific channel.

5 Claims, 16 Drawing Sheets

Related U.S. Application Data

(60) Provisional application No. 61/313,129, filed on Mar. 12, 2010, provisional application No. 61/321,508, filed on Apr. 7, 2010, provisional application No. 61/362,707, filed on Jul. 9, 2010.

(51) Int. Cl.
*H04W 72/04* (2009.01)
*H04W 84/12* (2009.01)
*H04W 16/14* (2009.01)

(56) References Cited

U.S. PATENT DOCUMENTS

| | | |
|---|---|---|
| 6,175,739 B1 | 1/2001 | Ishii et al. |
| 6,757,550 B1 | 6/2004 | Yoneyama et al. |
| 6,826,400 B1 | 11/2004 | Cashman et al. |
| 6,882,841 B1 | 4/2005 | Youn |
| 7,280,834 B2 | 10/2007 | Takarabe |
| 7,606,193 B2 | 10/2009 | McFarland et al. |
| 7,742,764 B2 | 6/2010 | Gillig et al. |
| 7,917,110 B2 | 3/2011 | Horiguchi et al. |
| 8,032,086 B2 | 10/2011 | Waltho et al. |
| 8,483,155 B1 | 7/2013 | Banerjea et al. |
| 8,583,129 B2 | 11/2013 | Kim et al. |
| 8,588,158 B2 * | 11/2013 | Kim et al. ............ 370/329 |
| 8,588,160 B2 * | 11/2013 | Kim et al. ............ 370/329 |
| 8,605,741 B2 | 12/2013 | Kim et al. |
| 8,792,466 B2 * | 7/2014 | Kim et al. ............ 370/338 |
| 8,913,577 B2 | 12/2014 | Kim et al. |
| 2002/0027919 A1 | 3/2002 | Eneroth et al. |
| 2002/0154653 A1 | 10/2002 | Benveniste |
| 2003/0050012 A1 | 3/2003 | Black et al. |
| 2003/0093526 A1 | 5/2003 | Nandagopalan et al. |
| 2005/0003827 A1 | 1/2005 | Whelan |
| 2005/0043047 A1 | 2/2005 | Vigier et al. |
| 2005/0063334 A1 | 3/2005 | Fnu et al. |
| 2005/0070279 A1 | 3/2005 | Ginzburg et al. |
| 2005/0169292 A1 | 8/2005 | Young |
| 2006/0034236 A1 | 2/2006 | Jeong et al. |
| 2006/0062183 A1 | 3/2006 | Forte et al. |
| 2006/0067354 A1 | 3/2006 | Waltho et al. |
| 2006/0089964 A1 | 4/2006 | Pandey et al. |
| 2006/0218392 A1 | 9/2006 | Johnston |
| 2007/0014267 A1 | 1/2007 | Lam et al. |
| 2007/0047492 A1 | 3/2007 | Kim et al. |
| 2007/0192472 A1 | 8/2007 | Tokunaga et al. |
| 2007/0253394 A1 | 11/2007 | Horiguchi et al. |
| 2008/0025282 A1 | 1/2008 | Hong |
| 2008/0130519 A1 | 6/2008 | Bahl et al. |
| 2008/0151796 A1 | 6/2008 | Jokela |
| 2008/0165754 A1 | 7/2008 | Hu |
| 2008/0171552 A1 | 7/2008 | Hyon et al. |
| 2008/0240024 A1 | 10/2008 | Rao et al. |
| 2008/0268832 A1 | 10/2008 | Peng |
| 2008/0298333 A1 | 12/2008 | Seok |
| 2009/0061783 A1 | 3/2009 | Choi et al. |
| 2009/0111463 A1 | 4/2009 | Simms et al. |
| 2009/0158282 A1 | 6/2009 | Blaisdell et al. |
| 2009/0171930 A1 | 7/2009 | Vaughan et al. |
| 2009/0191906 A1 | 7/2009 | Abedi |
| 2009/0196180 A1 | 8/2009 | Bahl et al. |
| 2009/0197627 A1 | 8/2009 | Kuffner et al. |
| 2009/0207800 A1 | 8/2009 | Shan et al. |
| 2009/0217333 A1 | 8/2009 | Young et al. |
| 2009/0268674 A1 | 10/2009 | Liu et al. |
| 2009/0270079 A1 | 10/2009 | Han et al. |
| 2009/0280748 A1 | 11/2009 | Shan et al. |
| 2009/0298522 A1 | 12/2009 | Chaudhri et al. |
| 2009/0323835 A1 | 12/2009 | Rao et al. |
| 2009/0325499 A1 | 12/2009 | Corke et al. |
| 2010/0008285 A1 | 1/2010 | Kuroda |
| 2010/0030907 A1 | 2/2010 | Pollak |
| 2010/0034160 A1 | 2/2010 | Prakash et al. |
| 2010/0048234 A1 | 2/2010 | Singh |
| 2010/0061299 A1 | 3/2010 | Kennedy et al. |
| 2010/0069013 A1 | 3/2010 | Chaudhri et al. |
| 2010/0081449 A1 | 4/2010 | Chaudhri et al. |
| 2010/0091712 A1 | 4/2010 | Lu et al. |
| 2010/0111235 A1 | 5/2010 | Zeng et al. |
| 2010/0124254 A1 | 5/2010 | Wu et al. |
| 2010/0142458 A1 | 6/2010 | Mark |
| 2010/0175101 A1 | 7/2010 | Devictor et al. |
| 2010/0177756 A1 | 7/2010 | Choi et al. |
| 2010/0195580 A1 | 8/2010 | Samarasooriya et al. |
| 2010/0195590 A1 | 8/2010 | Park |
| 2010/0195667 A1 | 8/2010 | Wang et al. |
| 2010/0220687 A1 | 9/2010 | Reznik et al. |
| 2010/0229205 A1 | 9/2010 | Hakusui |
| 2010/0232372 A1 | 9/2010 | Jakllari et al. |
| 2010/0246434 A1 | 9/2010 | Wang et al. |
| 2010/0246506 A1 | 9/2010 | Krishnaswamy |
| 2010/0303026 A1 | 12/2010 | Chaudhri et al. |
| 2010/0303051 A1 | 12/2010 | Umeuchi et al. |
| 2010/0309317 A1 | 12/2010 | Wu et al. |
| 2010/0309806 A1 | 12/2010 | Wu et al. |
| 2011/0019649 A1 | 1/2011 | Dayal et al. |
| 2011/0043710 A1 | 2/2011 | Samarasooriya et al. |
| 2011/0045781 A1 | 2/2011 | Shellhammer et al. |
| 2011/0090887 A1 | 4/2011 | Kim et al. |
| 2011/0090890 A1 | 4/2011 | Seok et al. |
| 2011/0091393 A1 | 4/2011 | Simmonds et al. |
| 2011/0116458 A1 | 5/2011 | Hsu et al. |
| 2011/0122855 A1 | 5/2011 | Henry |
| 2011/0164581 A1 | 7/2011 | Keon |
| 2011/0222488 A1 | 9/2011 | Kim et al. |
| 2011/0243078 A1 | 10/2011 | Kim et al. |
| 2011/0280228 A1 | 11/2011 | McCann et al. |
| 2011/0286405 A1 | 11/2011 | Kim et al. |
| 2011/0287802 A1 | 11/2011 | Ma et al. |
| 2012/0026941 A1 | 2/2012 | Ahmad et al. |
| 2012/0063364 A1 | 3/2012 | Emmelmann et al. |
| 2012/0096492 A1 | 4/2012 | Urban et al. |
| 2012/0096498 A1 | 4/2012 | Wu et al. |
| 2012/0120904 A1 | 5/2012 | Seok et al. |
| 2012/0165056 A1 | 6/2012 | Kim et al. |
| 2012/0170534 A1 | 7/2012 | Kim et al. |
| 2012/0208558 A1 | 8/2012 | Bajko et al. |
| 2012/0218956 A1 | 8/2012 | Kim et al. |
| 2012/0315855 A1 | 12/2012 | Li et al. |
| 2013/0103684 A1 | 4/2013 | Yee et al. |
| 2013/0114586 A1 | 5/2013 | Kim et al. |
| 2013/0142132 A1 | 6/2013 | Kim et al. |
| 2014/0113649 A1 | 4/2014 | Bajko et al. |

FOREIGN PATENT DOCUMENTS

| | | |
|---|---|---|
| CN | 1745528 A | 3/2006 |
| CN | 101006683 A | 7/2007 |
| CN | 101242333 A | 8/2008 |
| JP | 2000-504163 A | 4/2000 |
| JP | 2004-286460 A | 10/2004 |
| JP | 2007-043391 A | 2/2007 |
| JP | 2007-184850 A | 7/2007 |
| JP | 2007-300419 A | 11/2007 |
| JP | 2008-278456 A | 11/2008 |
| JP | 2009-200582 A | 9/2009 |
| JP | 2009-224881 A | 10/2009 |
| JP | 2013-520938 A | 6/2013 |
| JP | 2013-530608 A | 7/2013 |
| JP | 2013-535853 A | 9/2013 |
| KR | 10-2009-0021865 | 3/2009 |
| WO | 2006/117587 | 11/2006 |
| WO | 2009/016800 A2 | 2/2009 |
| WO | 2009031825 A2 | 3/2009 |
| WO | 2009/061779 A1 | 5/2009 |
| WO | 2009069068 A2 | 6/2009 |
| WO | 2009/104336 A1 | 8/2009 |
| WO | 2009/136760 A1 | 11/2009 |

OTHER PUBLICATIONS

Nekovee, M., A Survey of Cognitive Radio Access to TV White Spaces, Ultra Modern Telecommunications & Workshops, 2009, ICUMT '09, International Conference on, Oct. 12, 2009, pp. 1-8.

(56) References Cited

OTHER PUBLICATIONS

Office Action dated May 23, 2014, issued by the U.S. Patent & Trademark Office in U.S. Appl. No. 14/074,276.
Office Action dated Jun. 27, 2014, issued by the State Intellectual Property Office of China in Chinese Patent Application No. 201080065876.4.
Shkumbin Hamiti, Nokia, SDD editor, IEEE 802.16m System Description Document [Draft], IEEE 802.16m-08/003r8, IEEE, Apr. 10, 2009.
Notice of Allowance dated Oct. 29, 2014, issued by the U.S. Patent and Trademark Office in U.S. Appl. No. 12/908,449.
Office Action dated Nov. 26, 2014, issued by the State Intellectual Property Office in Chinese Patent Application No. 201180038039.7.
Office Action issued in related technology U.S. Appl. No. 12/993,409 mailed Jul. 3, 2012.
Notice of Allowance dated Sep. 29, 2015, issued by the U.S. Patent and Trademark Office in U.S. Appl. No. 14/547,991.
Office Action dated Jul. 3, 2014, issued by the State Intellectual Property Office of China in Chinese Patent Application No. 201080065374.1.
Office Action issued in related U.S. Appl. No. 13/046,048 dated Dec. 7, 2012.
Notice of Allowance issued in related U.S. Appl. No. 13/096,289 dated Dec. 10, 2012.
Cordeiro et al., IEEE 802.22: An Introduction to the First Wireless Standard based on Cognitive Radios, Journal of Communications, vol. 1, No. 1, pp. 38-47, Apr. 2006.
International Search Report application No. PCT/KR2010/006955 (Similar PCT application).
USPTO Office Action dated Feb. 12, 2013 in related technology U.S. Appl. No. 13/030,654.
USPTO Notice of Allowability dated Jul. 17, 2013 in related technology of U.S. Appl. No. 13/051,562.
USPTO Office Action dated Sep. 5, 2013 in related technology U.S. Appl. No. 12/908,449.
Srivastava et al. "Expanding Wireless Communication with White Space,"' White Paper of Dell Inc., Oct. 2008.
Stevenson et al. "IEEE 802.22: The First Cognitive Radio Wireless Regional Area Network Standard," IEEE Communications Magazine, Jan. 2009, pp. 130-138.
Sturza et al. "White Spaces Engineering Study: can cognitive radio technology operating in the TV white spaces completely protect licensed TN broadcasting?" New America Foundation Wireless Future Program, working paper No. 16, Jan. 2007.
Bahl et al. "White Space Networking with Wi-Fi like Connectivity," ACM SIGCOMM 2009, Aug. 17, 2009.
Pagadarai et al. "Wireless Spectrum Characterisation and Dynamic Utilization in Vehicular Communication Networks," Final Report, Wireless Innovation Laboratory, Worcester Polytechnic Institute, Sep. 30, 2009.
Wei et al. "Two-Hop-Relay Architecture for Next-Generation WWAN/WLAN Integration," IEEE Wireless Communications, Apr. 2004, pp. 2-9.
Singh et al. "PAMAS-Power Aware Multi-Access Protocol with Signalling for Ad Hoc Networks," Computer Communication Review, vol. 28, Issue 3, Jul. 1998, pp. 5-26.
Juha Ala Laurila et al. "Wireless LAN Access Network Architecture for Mobile Operators," Computer Communication Review, IEEE Communications Magazine, Nov. 2001, pp. 82-89.
Han et al., "Introduction of Cognitive Radio Network, KIISE Information Review", vol. 22, No. 2, pp. 1-16, Nov. 2008.

Mangold et al., "Spectrum agile radio: radio resource measurements for opport unities spectrum usage", IEEE Global telecommunications conference Nov. 29, 2004-Dec. 1, 2004, vol. 6, pp. 3467-3471, Nov. 2004.
Challapali et al., "Spectrum agile radio: detecting spectrum opportunities", ISART, Boulder, Colorado, Mar. 2-4, 2004.
PCT International Search Report for Application No. PCT/KR2011/001885 dated Oct. 26, 2011.
PCT International Search Report for Application No. PCT/KR2011/002276 dated Dec. 28, 2011.
PCT International Search Report for Application No. PCT/KR2010/008976 dated Aug. 22, 2011.
PCT International Search Report for Application No. PCT/KR2009/006103 dated Sep. 10, 2010.
PCT International Search Report for Application No. PCT/KR2009/06104 dated Sep. 30, 2010.
PCT International Search Report for Application No. PCT/KR2010/007011 dated Jun. 21, 2011.
PCT International Search Report for Application No. PCT/KR2010/006954 dated Jun. 24, 2011.
PCT International Search Report for Application No. PCT/KR2010/007076 dated Jun. 24, 2011.
Office Action from corresponding U.S. Appl. No. 12/993,409 dated Jan. 4, 2012.
Office Action dated Feb. 3, 2013 from the Canadian Intellectual Property Office in Canadian application 2,773,660.
USPTO Office Action dated Aug. 7, 2013 in related technology U.S. Appl. No. 13/384,844.
First Notification of Office Action dated Dec. 23, 2013 from The State Intellectual Property Office of China in counterpart Chinese application 200980161376.8.
USPTO Office Action dated Jan. 16, 2014 in related technology U.S. Appl. No. 14/074,276.
Ha Nguyen Tran, et al., Requirements and Amendment Regarding TVWS Database Access, IEEE 802.11-10/0262r1, IEEE mentor, Mar. 17, 2010, pp. 2-12.
Necati Canpolat, et al., TGu Single GAS Protocol, IEEE 802.11-10/0266r9, IEEE mentor, Mar. 18, 2010, pp. 2-57.
Eunsun Kim, et al., Normative Text for Scanning in TV Whitespaces, IEEE 802.11-10/0472r2, IEEE mentor, May 11, 2010, pp. 2-13.
USPTO Office Action dated Jan. 6, 2014 in related technology U.S. Appl. No. 12/933,409.
Nan Hao, et al., Short-Range WLAN Compatible Hybrid Cognitive Radio Networks System and MAC Protocol, Communication Software and Networks, 2009, ICCSN 2009 International Conference on Communication Software and Networks, IEEE, Feb. 28, 2009, pp. 81-86.
Office Action dated Apr. 1, 2014, issued by the State Intellectual Property Office of China in Chinese Patent Application No. 201080058187.0.
Notice of Allowance dated Apr. 25, 2014, issued by the U.S. Patent & Trademark Office in U.S. Appl. No. 12/993,409.
Office Action dated Jun. 25, 2014, issued by the U.S. Patent and Trademark Office in U.S. Appl. No. 12/908,449.
Chen Sun et al., Enabling Procedure of Communication in TVWS under FCC rules, IEEE 802.11-10/261r0, Feb. 2010.
Office Action dated Sep. 25, 2015, issued by the U.S. Patent and Trademark Office in U.S. Appl. No. 14/617,905.
Office Action dated Dec. 18, 2014, issued by the U.S. Patent and Trademark Office in U.S. Appl. No. 14/288,559.

* cited by examiner

Fig. 7

| B0 | B5 B6 | | | | B30 |
|---|---|---|---|---|---|
| Latitude Resolution | | Latitude Fraction | | | |
| Bits | 6 | | 25 | | |

| B31 | | B39 B40 | | B45 |
|---|---|---|---|---|
| Latitude Integer | | Longitude Resolution | | |
| Bits | 9 | | 6 | |

| B46 | | B70 B71 | B79 |
|---|---|---|---|
| Longitude Fraction | | Longitude Integer | |
| Bits | 25 | | 9 |

| B80 | B83 B84 | | B89 B90 | | B97 |
|---|---|---|---|---|---|
| Altitude Type | | Altitude Resolution | | Altitude Fraction | |
| Bits | 4 | | 6 | | 8 |

| B98 | | B119 B120 | B122 |
|---|---|---|---|
| Altitude Integer | | Datum | |
| Bits | 22 | | 3 |

| B123 | B124 | B125 | B126 | B127 |
|---|---|---|---|---|
| RegLoc Agreement | RegLoc DSE | Dependent STA | Reserved | |
| Bits 1 | 1 | 1 | 2 | |

| B128 | B143 |
|---|---|
| Dependent Enablement Identifier | |
| Bits | 16 |

| B144 | | B151 B152 | | B159 |
|---|---|---|---|---|
| Regulatory Class | | Channel Number | | |
| Bits | 8 | | 8 | |

Fig. 9

| B0 | | B5 | B6 | | | B30 |
|---|---|---|---|---|---|---|
| | Latitude Resolution | | | Latitude Fraction | | |

Bits      6                25

| B31 | | B39 | B40 | | B45 |
|---|---|---|---|---|---|
| | Latitude Integer | | | Longitude Resolution | |

Bits           9              6

| B46 | | B70 | B71 | | B79 |
|---|---|---|---|---|---|
| | Latitude Fraction | | | Latitude Integer | |

Bits         25            9

| B80 | B83 | B84 | | B89 | B90 | | B97 |
|---|---|---|---|---|---|---|---|
| Altitude Type | | | Altitude Resolution | | | Altitude Fraction | |

Bits    4         6          8

| B98 | | B119 | B120 | | B122 |
|---|---|---|---|---|---|
| | Altitude Integer | | | Datum | |

Bits         22           3

| B123 | B124 | B125 | B126 | B127 |
|---|---|---|---|---|
| RegLoc Agreement | RegLoc DSE | Dependent STA | Dependent AP | Reserved |

Bits    1       1       1       1       1

| B128 | B143 |
|---|---|
| Dependent Enablement Identifier | |

Bits           16

| B144 | | B151 | B152 | | B159 |
|---|---|---|---|---|---|
| | Regulatory Class | | | Channel Number | |

Bits         8           8

| Element ID | Length | ResponderSTA Address | BSSID (optional) |
|---|---|---|---|
| Octets: 1 | 1 | 6 | 0 or 6 |

(a)

| Element ID | Length | Enabling STA Address | Enabling STA Timestamp | BSSID |
|---|---|---|---|---|
| Octets: 1 | 1 | 6 | 8 | 6 |

(b)

| Category | Action Value | RequesterSTA Address | ResponderSTA Address | Reason Result Code | Enablement Identifier |
|---|---|---|---|---|---|
| Octets: 1 | 1 | 6 | 6 | 1 | 2 |

| Element ID | Length | Channel Switch Mode | New Channel Number | Channel Switch Count |
|---|---|---|---|---|
| 1 | 1 | 1 | 1 | 1 |

Octets:

Fig. 19

| Element ID | Length | Channel Number |
|---|---|---|

Octets:    1         1         1 * k

Fig. 20

| Category | Action value | Channel Occupancy Information Element |
|---|---|---|

Octets:    1         1         (2 + k)

| Category | Action | WSM element body fields |
|---|---|---|
| 1 | 1 | variable |

Octets:

METHOD AND APPARATUS FOR PROTECTING A PRIMARY SERVICE IN WLAN SYSTEM

CROSS REFERENCE TO RELATED APPLICATIONS

This application is a continuation application of U.S. patent application Ser. No. 14/052,603, filed on Oct. 11, 2013, which is a continuation application of U.S. patent application Ser. No. 12/910,186, filed on Oct. 22, 2010, which claims the benefit of U.S. provisional application Ser. No. 61/313,129, filed on Mar. 12, 2010; Ser. No. 61/321,508, filed on Apr. 7, 2010; and Ser. No. 61/362,707, filed on Jul. 9, 2010, the entire disclosure of each of which is hereby incorporated by reference for all purposes as if fully set forth herein.

BACKGROUND OF THE INVENTION

1. Field of the Invention

The present invention relates to a wireless local area network (WLAN), and more particularly, a method and an apparatus for protecting a primary service as an unlicensed device in a regulatory domain where a licensed device and the unlicensed device are permitted to operate.

2. Discussion of the Related Art

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device. TV White Space may include UHF band and VHF band. The spectrum not used by a licensed device (hereinafter, can be called as 'White Space') can be used by an unlicensed device. The frequency band permitted to be used by unlicensed device can be differently defined for each country. Generally, this frequency band comprises 54-698 MHz (US, Korea), and some of this frequency band can't be used for the unlicensed device. Here, 'licensed device' means a device of the user permitted in this frequency band, and can be differently called as 'primary user', or 'incumbent user'. Hereinafter, the term of 'incumbent user' can be collectively used for these terms.

The unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unlicensed device, is used by the incumbent user.

On the other hand, in order to efficiently operate the unlicensed device on TVWS, more discussion is needed on an enabling mechanism of letting the unlicensed device to operate in TVWS, how efficiently the unlicensed device finds the network to be connected, how the information for the available channel in TVWS is efficiently acquired, efficient format of that information, and efficient signaling mechanism to exchange this information, etc.

SUMMARY OF THE INVENTION

Technical Problem

One aspect of the present invention is for the enabling mechanism of letting the unlicensed device to operate in TVWS in order to efficiently operate the unlicensed device on TVWS.

One example of this aspect is for providing a solution for the specific case when dependent station receives enabling signal from a dependent AP station.

The other example of this aspect is for providing efficient way for an access point (AP) station to operate as a dependent station within TVWS. Another aspect of the present invention is for a mechanism that the unlicensed device efficiently finds the network to be connected.

Another aspect of the present information is for providing a mechanism to protect the incumbent user from the operation of the unlicensed device in TVWS.

Another aspect of the present information is for efficient format of the information for the available channel in TVWS.

The object of the present invention is not limited the above stated objects, but includes various objects recited or apparent among the detailed description of the present invention.

Technical Solution

One aspect of the present invention provides a method of protecting a primary service by a station as an unlicensed device in a regulatory domain where a licensed device and the unlicensed device are permitted to operate, the method comprising: acquiring a list of identified available channels for the operation of the unlicensed device and maximum allowed transmission powers of the identified available channels from a regulatory domain database system; generating a white space map (WSM) comprising the list of identified available channels and the maximum allowed transmission powers of the identified available channels; updating the WSM when the station acquires information that a primary service signal is detected on a specific channel which is indicated as available in the WSM; and transmitting the updated WSM to another station such that the another station moves to another channel if the another station is operating on the specific channel.

The method can further comprises: receiving, from a specific station, a measurement report in which the primary service signal is detected on the specific channel which is indicated as available in the WSM. In one example, the specific station can comprise a Digital TV device.

In this method, the station updating the WSM can be an enabling station determining the available channels at its location using its own geographic location identification and a regulatory database access capability. And, the another station can be a dependent station receiving the information for the available channels from the enabling station or a dependent AP (Access Point) station that enables the operation of the dependent station. The updated WSM can be transmitted from the station via one of a beacon frame, a probe response frame, and a white space map announcement frame.

In one embodiment of the present invention, the station updating the WSM may be non-AP station, and in this case, the updated WSM can be transmitted from the non-AP station via a white space map announcement frame.

Specifically, the step of transmitting the updated WSM can comprise: receiving, at a MAC sublayer management entity (MLME) of the non-AP station from a station management entity (SME) of the non-AP station a requesting primitive requesting that the white space map announcement frame be sent to the another station; and transmitting, from the MLME of the non-AP station to a MLME of the another station, the white space map announcement frame comprises the updated WSM, wherein the requesting primitive comprises the MAC address of the another station and the updated WSM. The requesting primitive can be called as a MLME.WSM.request message. The updated WSM can be transmitted, from the MLME of the another station to a SME of the another station, via an indication primitive indicating the reception of the updated WSM. The indication primitive can be called as a MLME-WSM.indication primitive.

Preferably, the WSM can be generated in a format of a White Space Map Element comprising a map version field, a channel number field, and maximum power level field. Here, the value in the map version field can be circularly incremented by 1, the channel number field can indicate the list of identified available channels, and the maximum power level field can indicate the maximum allowed transmission powers of the identified available channels.

Another aspect of the present invention provides an apparatus for protecting a primary service as an unlicensed device in a regulatory domain where a licensed device and the unlicensed device are permitted to operate, the apparatus comprising: a processor configured to acquire a list of identified available channels for the operation of the unlicensed device and maximum allowed transmission powers of the identified available channels from a regulatory domain database system, generate a white space map (WSM) comprising the list of identified available channels and the maximum allowed transmission powers of the identified available channels, and update the WSM when the station acquires information that a primary service signal is detected on a specific channel which is indicated as available in the WSM; and a transceiver configured to transmit the updated WSM to another station such that the another station moves to another channel if the another station is operating on the specific channel.

The transceiver can be further configured to receive, from a specific station, a measurement report in which the primary service signal is detected on the specific channel which is indicated as available in the WSM. In one example, the specific station can comprise a Digital TV device.

The apparatus can be configured to operate as an enabling station determining the available channels at its location using its own geographic location identification and a regulatory database access capability. And, the another station can be a dependent station receiving the information for the available channels from the enabling station or a dependent AP (Access Point) station that enables the operation of the dependent station. The updated WSM can be transmitted from the apparatus via one of a beacon frame, a probe response frame, and a white space map announcement frame.

The apparatus can be a non-AP station. In this case, the transceiver of the non-AP station may transmit the updated WSM via a white space map announcement frame, and the processor can comprise a MAC sublayer management entity (MLME) and a station management entity (SME). The MLME of the apparatus can be configured to receive a requesting primitive requesting that the white space map announcement frame be sent to the another station from the SME of the apparatus, and to transmit the white space map announcement frame comprises the updated WSM to a MLME of the another station, wherein the requesting primitive comprises the MAC address of the another station and the updated WSM. Here, the requesting primitive can be called as a MLME.WSM.request message. The updated WSM can be transmitted, from the MLME of the another station to a SME of the another station, via an indication primitive indicating the reception of the updated WSM. Here, the indication primitive can be called as a MLME-WSM.indication primitive.

Preferably, the WSM can be generated in a format of a White Space Map Element comprising a map version field, a channel number field, and maximum power level field, wherein the value in the map version field is circularly incremented by 1, the channel number field indicates the list of identified available channels, and the maximum power level field indicates the maximum allowed transmission powers of the identified available channels.

Advantageous Effect

According to one aspect of the present invention, effective enabling mechanism is provided.

Especially, it is more efficient to classify the unlicensed devices as an enabling station and a dependent station, where the enabling station is a station determining the available channels at its location using its own geographic location identification and a regulatory database access capability, while the dependent station is a station receiving the available channel list from the enabling station or a dependent AP (Access Point) station that enables the operation of the dependent station. It is because if all the unlicensed devices decide their own enablement in TVWS, all of them have to have regulatory database access capability, and there shall be a signaling overhead. Further, specifically defining the operation of AP station as a first type dependent station which receives WSM from the enabling station as a dependent station, but providing information for the second type dependent station, the system can be more effectively deployed. And, one example of the present invention provide a solution for the case when dependent station receives enabling signal from a dependent AP station. That is, by using transmitting/receiving the MAC address of the enabling station during the DSE (Dynamic Station Enablement) procedure, the dependent station may know the MAC address of the enabling station even when the enabling signal is received from a dependent AP station.

According to another aspect of the present invention, the unlicensed device can efficiently find the network to be connected, since it needs not to scan all the channels. That is, by using the received WSM information, the scanning process can be limited to the allowable channels identified by the received WSM. Therefore, scanning time can be reduced significantly.

According to another aspect of the present invention, the incumbent user can be more effectively protected. That is, by using the measurement report from a STA (e.g. DTV device) and by using the update mechanism of the WSM, the incumbent user can be more strongly protected.

According to another aspect of the present invention, efficient format of the WSM is presented.

Various effects, not explicitly recited in this section, can be achieved by the present invention according to the following description.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 7 shows an exemplary format of Registered Location element body field, FIG. 9 shows a newly defined DSE Registered location element body field according to one example of the present invention, FIG. 19 shows an exemplary channel occupancy information element structure, FIG. 20 shows an exemplary Channel Occupancy Frame structure.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
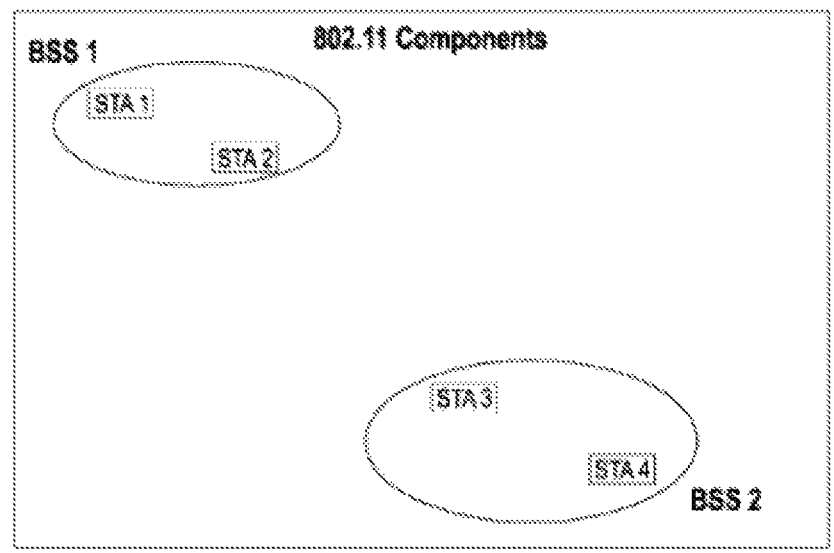
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without preplanning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
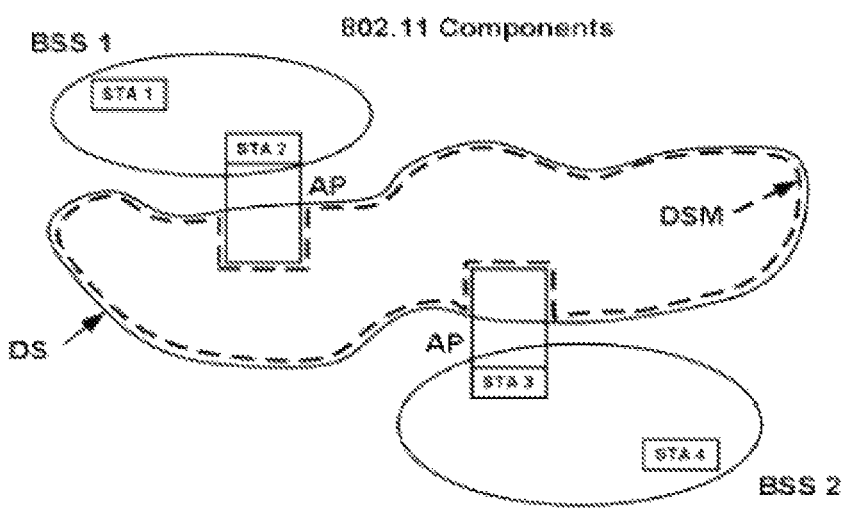
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended Service Set (ESS) for a large coverage network is explained.

Figure 3:
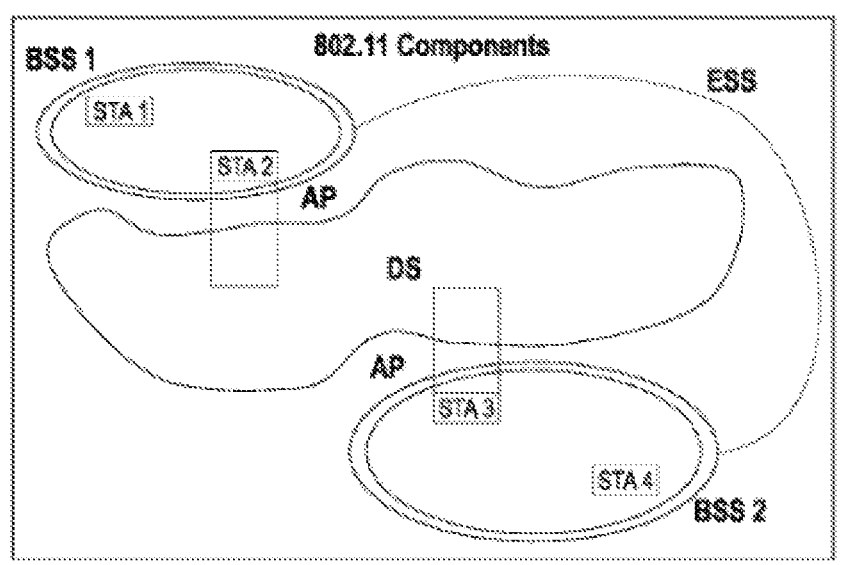
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

The BSSs may partially overlap. This is commonly used to arrange contiguous coverage within a physical volume.

The BSSs could be physically disjoint. Logically there is no limit to the distance between BSSs.

The BSSs may be physically collocated. This may be done to provide redundancy.

One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
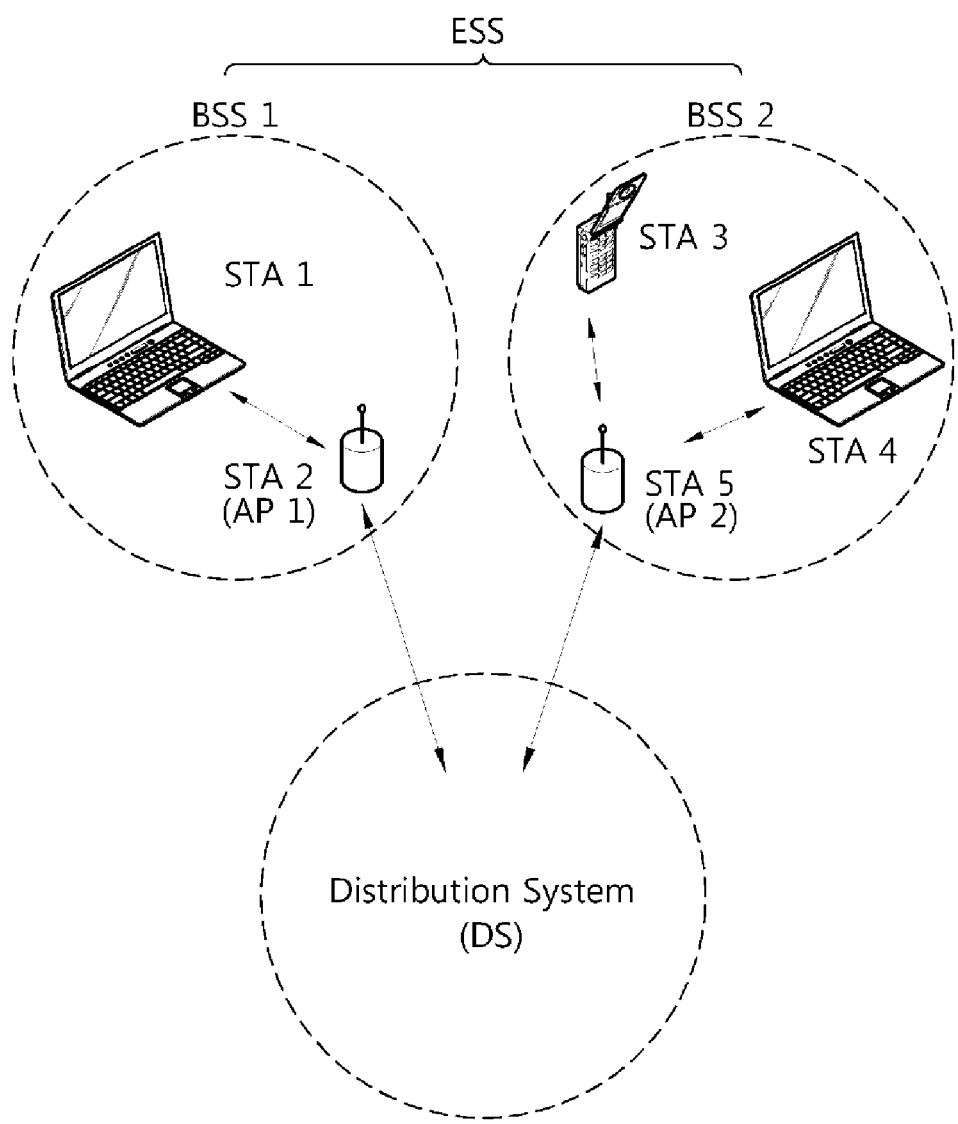
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS. In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP WS STA' or 'WS STA'. AP can corresponds to Base Station (BS), Node-B, BTS (Base Transceiver System), or Femto BS in another field of wireless communication. AP, which can operate within TVWS, can be called as WS AP.

Based on this understanding, the enabling mechanism of letting the unlicensed device to operate in TVWS according to one aspect of the present invention is explained.

In order for the unlicensed device to operate in TVWS, the unlicensed device should acquire information for available channels in TVWS not used by incumbent users. The most casual approach for this is defining such that all the unlicensed devices performs sensing whether there is a primary signal of the incumbent user on each of the channels in TVWS. However, it may cost huge overhead, thus another approach can be using a regulatory database, such as TV band database which includes information which of the channels are available for the WLAN operation at specific geographic location. The present invention prefers to use the latter approach.

Further, if all the unlicensed devices access the regulatory database to acquire information for the available channels, it may be inefficient, and produce large signaling overhead. Thus, embodiments of the present invention propose to classify the unlicensed devices (STAs) into an enabling STA, and a dependent STA. Enabling STA in TVWS is defined as a STA determines the available TV channels at its location using its own geographic location identification and TV bands database access capabilities. Dependent STA in TVWS is defined as a STA receives available TV channel list from the enabling STA or the dependent AP of that enabling STA that enables its operation. Thus, according to the embodiment, enabling STA takes the role to permit the dependent STA to operate within TVWS within the available channels (the role to enable the dependent STA). This enabling procedure can be called as dynamic station enablement (DSE) procedure.

Figure 5:
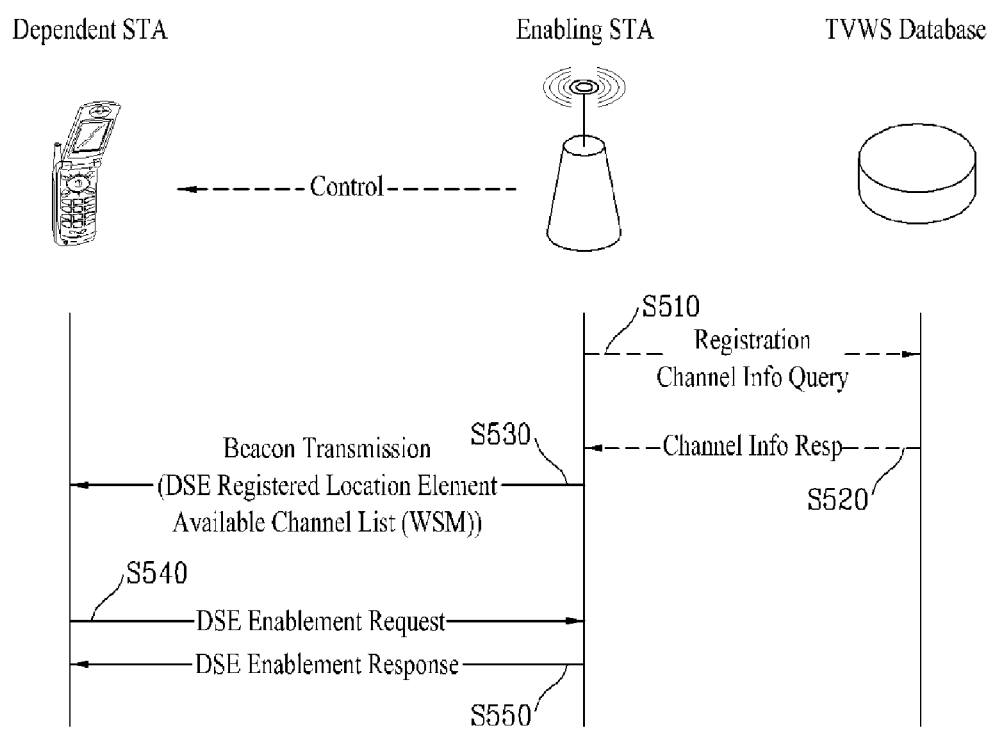
FIG. 5 is a conceptual diagram to explain the enabling mechanism according to one embodiment of the present invention.

FIG. 5 is a conceptual diagram to explain the enabling mechanism according to one embodiment of the present invention.

In FIG. 5, there is TVWS database, an enabling STA and a dependent STA. The enabling STA can be either an AP STA or non-AP STA. But, in an example of FIG. 5, assume that the enabling STA is an AP enabling STA.

According to the embodiment, the enabling STA access the TVWS database for registration and querying channel information (S510). It is more efficient for the enabling STA to acquire available channel list from TVWS database than sensing each of the channels to determine whether it is available or not. Thus, the enabling STA of the present embodiment acquires the available channel list from TVWS database via Channel Info Response (S520).

Then, the enabling AP STA of this example may transmit beacon frame to the dependent STA (S530) as an enabling signal to permit the dependent STA to operate within TVWS. According to one embodiment of the present invention, this enabling signal comprises the beacon frame containing a DES Registered Location Element with 'DSE RegLoc bit' set to 1. Further, the present embodiment proposes the enabling STA to transmit information for the available channel list from TVWS. Hereinafter, the available channel list from TVWS can be called as White Space Map (WSM) or WSM element. However, enabling STA can transmit enabling signal other than the TVWS. For example, the enabling STA can transmit beacon frame containing a DES Registered Location Element with 'DSE RegLoc bit' set to 1 through 2.4 GHz band.

The dependent STA, according to the present embodiment, should operate within the available channels identified by the received WSM after it becomes enabled. And, the dependent STA, according to the present embodiment, may exchange DSE related message with the enabling STA. More specifically, the dependent STA may transmit DSE Enablement Request message to the enabling STA for the enablement of the dependent STA (S540). Then, the enabling STA may respond to this request by DSE Enablement Response message (S550).

And, one embodiment of the present invention proposes that the enabling station transmits the WSM after the transmission of a DSE Enablement frame (not shown in FIG. 5). It is efficient for the dependent station to reduce scanning time for searching network to be connected.

Figure 6:
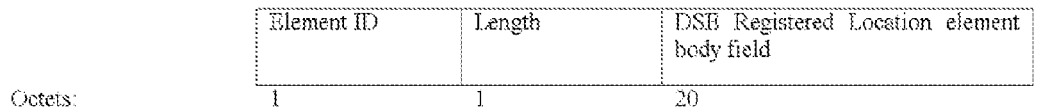
FIG. 6 shows an exemplary format of DSE Registered Location Element.

FIG. 6 shows an exemplary format of DSE Registered Location Element, and FIG. 7 shows an exemplary format of Registered Location element body field.

As stated above, DSE Registered Location element (FIG. 6) with RegLoc DSE bit (FIG. 7) set to 1 can be an enabling signal permitting the dependent STA to operate WLAN operation in TVWS. The dependent STA, receiving and decoding the DSE Registered Location element, may transmit Enablement Request Frame to the Enabling STA. The dependent STA shall transmit the Enablement Request Frame on a channel identified by 'Channel Number' field of Registered Location element body, as shown in FIG. 7. This channel identified by 'Channel Number' field of Registered Location element body can be located other than TVWS, or within TVWS among the available channels identified by WSM. Then, the enabling STA transmits Enablement Response Frame to the dependent STA, and if the dependent STA receives it, the DSE procedure is completed.

On the other hand, dependent STA according to IEEE 802.11y should receive the enabling signal from the enabling STA over-the-air. However, this requirement is not necessarily applied to TV White Space. Therefore, the dependent AP also can transmit the enabling signal by transmitting beacon frame, probe response frame including DSE Registered Location element.

Figure 8:
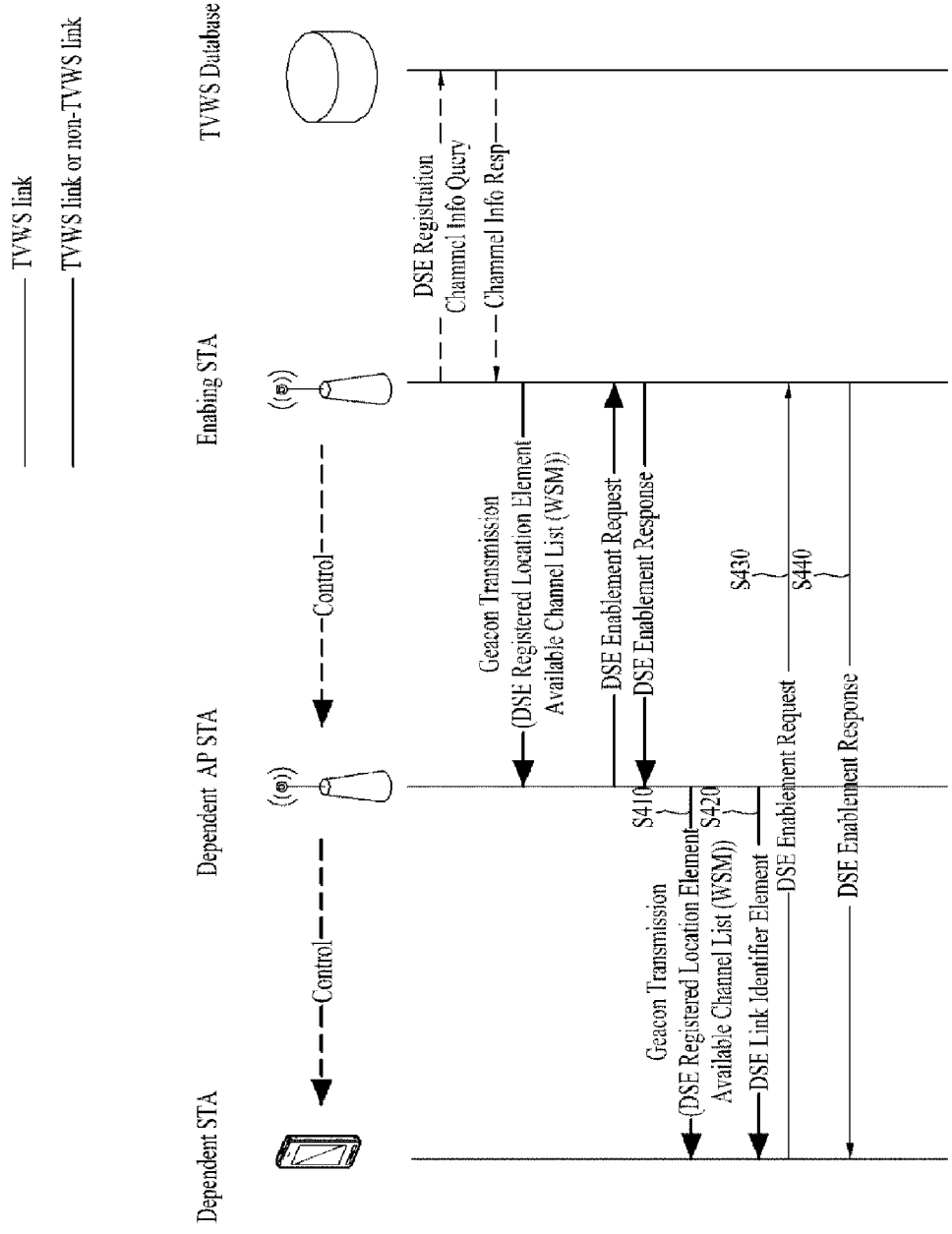
FIG. 8 shows another example of the present invention regarding the address of the enabling STA.

FIG. 8 shows another example of the present invention regarding the address of the enabling STA.

The DSE procedure between the enabling STA and the dependent AP STA is the same as shown in FIG. 5. As stated above, dependent AP receives the enabling signal (DSE Registered Location element with DSE RegLoc bit set to 1) and WSM from enabling STA, transmits DSE Enablement request message, receives DSE Enablement response message, and then enabled.

In this example, the dependent AP STA also can transmit enable signal (DSE Registered Location element with DSE RegLoc bit set to 1) to the dependent STA (S410). Here, dependent AP may transmit beacon frame including DSE Registered Location element through non-TVWS Link.

Dependent AP of the present embodiment shall inform the dependent STA that this DSE Registered Location element is transmitted by the dependent AP. Thus, Reserved Bit (B126) of DSE Registered Location element (FIG. 7) can be used as 'Dependent AP indication bit'.

FIG. 9 shows a newly defined DSE Registered location element body field according to one example of the present invention. As shown in FIG. 5, the newly defined DSE Registered location element includes Dependent AP bit.

Table 1 shows the values of Dependent STA bit and Dependent AP bit according to the subject of transmitting DSE Registered location element.

TABLE 1

|  | Dependent STA bit value | Dependent AP bit value |
|---|---|---|
| Enabling STA | False | False |
| Dependent AP | True | True |
| Dependent STA | True | False |

As shown in Table 1, Dependent AP bit is used to identify Dependent AP from Dependent STA. That is, dependent STA receiving DSE Registered location element can be informed whether the DSE Registered location element it transmitted from the dependent AP STA or enabling STA based on the values of Dependent STA bit and Dependent AP bit.

On the other hand, the DSE Registered location element may only include the transmitter's address in it. Thus, if the dependent STA receives the enabling signal from the dependent AP, the dependent STA can't know the address of the enabling signal. In this case, the dependent STA can't transmit the DSE Enablement Request to the enabling STA. Therefore, one embodiment of the present invention proposes for the dependent AP STA to transmit a DSE Link identifier element including MAC address of the enabling STA during the DSE procedure.

Figures 10, 11, 12:
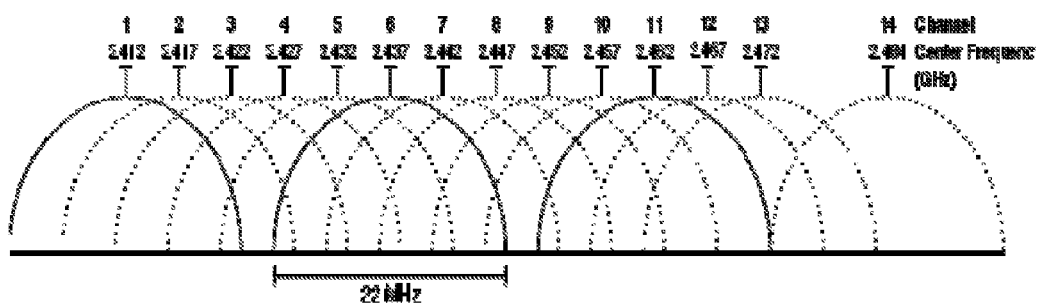
FIG. 10 shows an exemplary format of DSE Link identifier element of one embodiment of the present invention.
FIG. 11 shows an exemplary DSE Enablement Frame format.
FIG. 12 shows channels defined in 2.4 GHz band for WLAN operation.

FIG. 10 shows an exemplary format of DSE Link identifier element of one embodiment of the present invention.

In (a) of FIG. 10, the Element ID field is equal to the DSE Link Identifier value. The Length field may be set to 12. The ResponderSTAAddress field is the MAC address of the enablement responder STA that grants enablement (enabling STA). The length of the ResponderSTAAddress field may be 6 octets.

The BSSID field may set to the BSSID of the BSS to which the enablement responder STA is associated. When the DSE enablement messages are exchanged over the air, the dependent STA should know the BSSID associated with the enabling STA. Thus, When the DSE enablement messages are not exchanged over the air, the BSSID field may not be present.

In (b) of FIG. 10, DSE Link identifier element may further includes enabling STA timestamp field for time synchronization among enabling STA, dependent AP and dependent STA associated to the corresponding AP.

Referring back to FIG. 8, dependent AP transmits DSE Link identifier element to the dependent STA (S420). By using this, the dependent STA can acquire the MAC address of the enabling STA. Thus, the dependent STA may transmit DSE Enablement frame to the enabling STA for the enablement (S430). Here, the dependent STA transmits DSE Enablement frame on a channel identified by 'Channel Number' field of Registered Location element body received from the dependent AP.

Further, according to another embodiment of the present invention, the dependent STA may broadcast DSE identifier element including the address of the enabling STA. When, the dependent STA is AP STA, this DSE Identifier element can be transmitted via beacon frame or probe response frame.

FIG. 11 shows an exemplary DSE Enablement Frame format.

When DSE Enablement Frame format of FIG. 11 is DSE Enablement frame for DSE Enablement Request, RequesterSTAAddress field indicates MAC address of STA transmitting this DSE Enablement Frame, and ResponderSTAAddress field indicates MAC address of STA receiving this DSE Enablement Frame. Reason Result Code field may indicates whether this DSE Enablement Frame is for DSE Enablement Request, or DSE Enablement Response. Enablement identifier field may indicate enablement ID allocated by the enabling STA to the dependent STA, when DSE Enablement Frame is for DSE Enablement Response.

Thus, RequesterSTAAddress field of the DSE Enablement frame for DSE Enablement request transmitted by dependent STA indicates the MAC address of the dependent STA, and ResponderSTAAddress field indicates the MAC address of the enabling STA, and Reason Result Code field indicates this DSE Enablement Frame is for DSE Enablement Request. And, Enablement identifier field is set to invalid value.

Address 3 field of MAC header of DSE Enablement Request frame is set to BSSID field of DSE Link Identifier element, ResponderSTAAddress field of DSE Enablement Request frame is set to MAC address of the enabling STA receiving DSE Enablement Request frame via DSE Link Identifier element.

As shown in FIG. 8, enabling STA receiving the DSE Enablement Request frame transmits DSE enablement frame for DSE Enablement Response (S440). Here, Enabling STA may allocate (Dependent) Enablement Identifier of 16 bits to the dependent STA.

When DSE Enablement Frame format of FIG. 11 is for DSE Enablement Response, the RequesterSTAAddress field of the DSE Enablement frame for DSE Enablement Response indicates the MAC address of the enabling STA, ResponderSTAAddress field indicates the MAC address of the Dependent STA, Reason Result Code field indicates that the DSE Enablement frame is for DSE Enablement Response. And, Enablement identifier field may include Enablement ID allocated to the dependent STA by the enabling STA.

In brief, embodiments of the present invention propose to classify the unlicensed devices (STAs) into an enabling STA, and a dependent STA. Enabling STA in TVWS is defined as a STA determines the available TV channels at its location using its own geographic location identification and TV bands database access capabilities. Dependent STA in TVWS is defined as a STA receives available TV channel list from the enabling STA or the dependent AP of that enabling STA that enables its operation. Thus, according to the embodiment, enabling STA has an authority to permit the dependent STA to operate within TVWS within the available channels (the role to enable the dependent STA). This enabling procedure can be called as dynamic station enablement (DSE) procedure.

Hereinafter, another aspect of the present invention for a mechanism that the unlicensed device efficiently finds the network to be connected is disclosed. This aspect of the present invention is related to how the information for the available channel in TVWS is efficiently acquired.

In order to operate in TVWS as an unlicensed device, a STA should find the network to be connected. This type of process may be called as 'scanning'. If we assume that the channel bandwidth used for by the IEEE 802.11 TVWS protocol in TVWS is the same as the channel bandwidth used by Digital TV (DTV), the channel bandwidth of each channel shall be 6 MHz. For IEEE 802.11 operation in 2.4 GHz and 5 GHz, the channel bandwidth is 20 MHz. This means that there are a lot more channels to be scanned by a STA in TVWS than the channels in 2.4 GHz and/or 5 GHz. This can significantly increase the scanning time and power consumption for a STA to find the network to be connected.

Also, in order to operate in TVWS as an unlicensed device, a STA should have a mechanism for protecting the incumbent user. The most casual approach to find the available channel in TVWS is performing, at the STA, 'sensing' to find whether there is an incumbent user operates on a specific channel. (It should be noted that the term 'sensing' is for finding whether there is a primary signal on a specific channel, that is, for finding the available channel, while the term 'scanning' is for finding the network to be connected.) Another approach is accessing the external regulatory domain database (DB) to find the available channel list in TVWS. For the TVWS, the external regulatory DB can be TV band database. The DB can include information for scheduling of licensed users at a specific geographic location. Therefore, one embodiment of the present invention proposes the enabling STA to access via internet to the regulatory domain database and acquire the available channel list at its own geographic location, and to deliver this available channel lists to other STAs, rather than each of the STAs perform sensing every channels to find whether they are available or not. In this document, information for the available channel list from the regulatory domain database may be called as 'White Space Map (WSM)' Further, if a STA acquires the available channel list in TVWS to operate, the STA need not perform scanning on a channel identified as not available by WSM. Therefore, acquiring the WSM from DB and delivering this WSM can efficiently reduce the scanning time and power consumption.

Here, one embodiment of the present invention proposes the WSM indicating the list of available channels with the first channel granularity, while the second channel granularity is used for the WLAN operation. This is explained with regards to FIGS. 12-15.

FIG. 12 shows channels defined in 2.4 GHz band for WLAN operation.

As shown in FIG. 12, there are 14 channels for WLAN operation in 2.4 GHz band. Each of the channels has center frequency at 2.412, 2.417, 2.422, . . . , 2.472 GHz. And, orthogonal channels which do not overlap each other are used for WLAN operation. In FIG. 12, channels 1, 6 and 11 can be used for WLAN operation. FIG. 12 shows each channel span over 22 MHz, however it is actually 20 MHz used for WLAN operation. (20 MHz channel granularity)

Depending on the country, the channels used for WLAN operation can be different. For example, channels 1-11 are used for WLAN operation in North America. Example shown in FIG. 12 is for 20 MHz channel granularity for WLAN operation. However, IEEE 802.11 PHY can use 5, 10, 20 and 40 MHz granularity using deferent sample rates.

Figure 13:
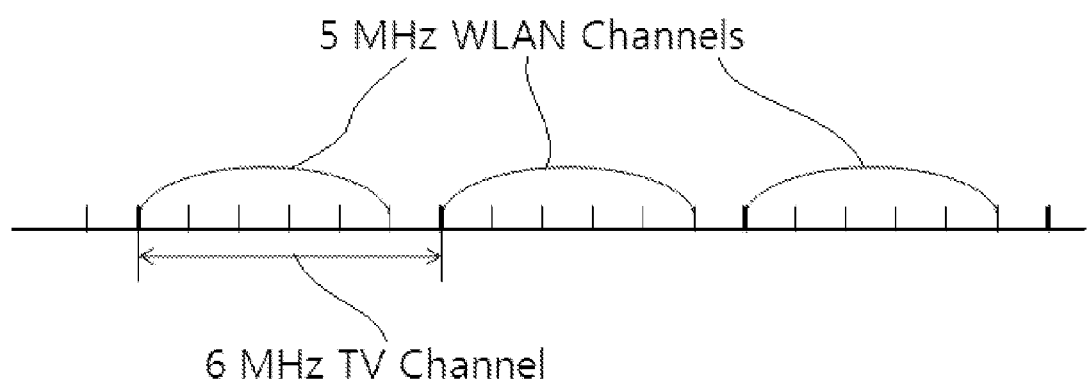
FIGS. 13 and 14 show examples for the channel granularity relationship between TV channel and WLAN channel.
Figure 14:
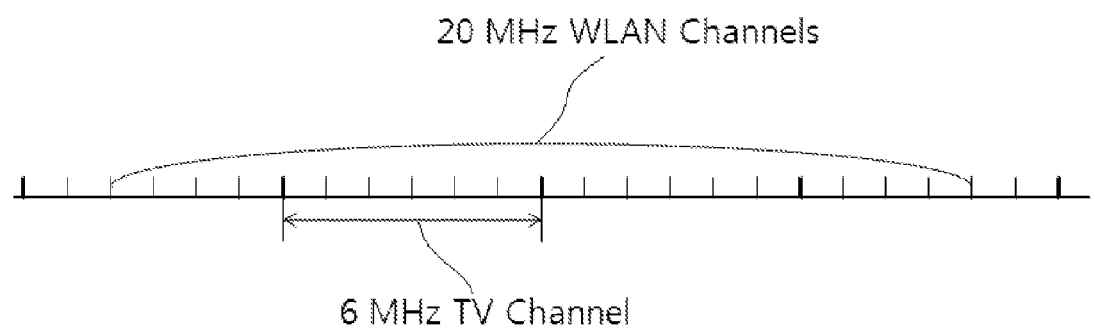

FIGS. 13 and 14 show examples for the channel granularity relationship between TV channel and WLAN channel.

As stated above, TV band database has available channel information with 6 MHz TV channel. Thus, if the WSM is designed to indicate available channel with 5 MHz (or 10/20/40 MHz) for WLAN operation, it may cost to modify the information already in the TV band database. Therefore, one example of the present invention propose the WSM indicating available TV channels with 6 MHz channel granularity, and the WLAN STA receiving the WSM and operating as an unlicensed device operates using 5 MHz (or 10/20/40 MHz) channel granularity. FIGS. 13 and 14 show an examples for 5 MHz and 20 MHz channel granularities for WLAN operation, while the WSM indicates the available TV channels.

Figure 15:
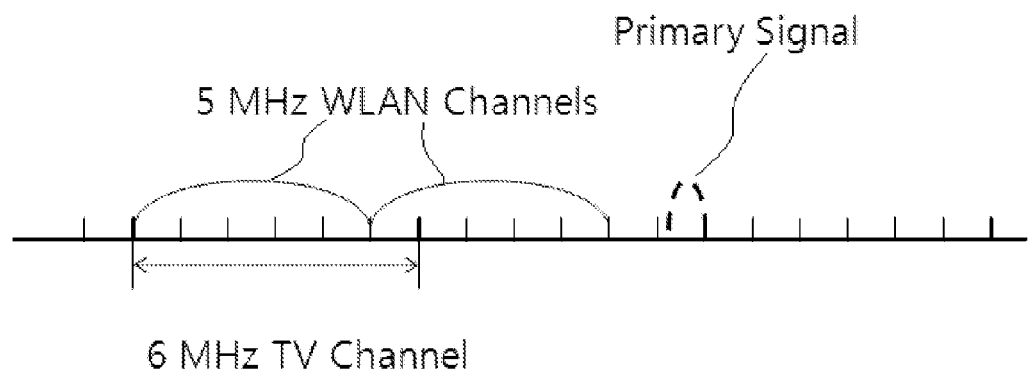
FIG. 15 shows a situation when a primary signal having a bandwidth less than 1 MHz is present, FIG. 16 schematically shows the passive scanning scheme according to one embodiment of the present invention, FIG. 17 schematically shows the active scanning scheme according to another embodiment of the present invention.

Further, even when we modifies the channel granularity from the TV band database, it is not efficient to design available channels with granularity of 5/10/20/40 MHz. Rather, one example of the present invention proposes to use smaller channel granularity, such as 1 MHz, for the WSM. FIG. 15 shows the benefit of this example.

There is a situation when a primary signal having a bandwidth less than 1 MHz (for example, microphone signal) is present as shown in FIG. 15. In this case, the whole of 6 MHz TV channel within which the primary signal is detected can be treated as unavailable. This can waist the frequency resource. However, if the WSM indicates available channel with 1 MHz channel granularity, 5 MHz WLAN channel can be established as shown in FIG. 15, thus, according to this example, we can efficiently use the available frequency resource.

In another example of the present invention propose the WSM to indicate channels which are not available, instead of indicating available channels. When there are fewer channels which are not available for WLAN operation, it is more efficient to indicate unavailable channels, instead of available channels.

Based on this, the scanning process according to one aspect of the present invention will be disclosed. In IEEE 802.11, there are two types of scanning process. One is a passive scanning process, and the other is an active scanning process. Two types of scanning processes according to one aspect of the present invention are explained.

Figure 16:
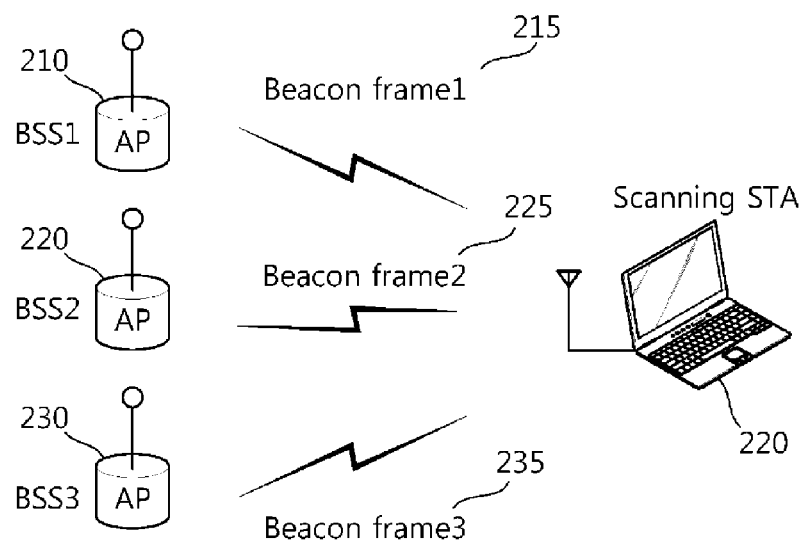

FIG. 16 schematically shows the passive scanning scheme according to one embodiment of the present invention.

In the passive scanning scheme, the scanning STA waits for a beacon frame while moving each channel on a channel list. The channel list specifies a list of channels that are examined when scanning for a BSS. In present embodiment, the list of channels is restricted to the available channel list identified by WSM to reduce the scanning time.

The beacon frame, one of management frames in IEEE 802.11, is periodically transmitted to inform about the presence of a wireless network, allow the scanning STA to search for the wireless network to join it. In an infrastructure network, an access point (AP) serves to periodically transmit the beacon frame.

When the scanning STA receives the beacon frame, it buffers the beacon frame to acquire information about a BSS, and records the beacon frame information in each channel while moving channels within the available channels identified by the received or acquired WSM.

With reference to FIG. 16, assume that a scanning STA 220 is a laptop computer equipped with IEEE 802.11 communication module. Also, assume that the scanning STA 220 operates as a dependent STA, which was enabled and receives WSM comprising available channel list in TVWS from an enabling STA or an AP.

A scanning STA 220 performs channel scanning in a particular channel within the available channels according to the passive scanning scheme. If the scanning STA 220 receives a beacon frame 215 transmitted by an AP1 210 of a BSS1 and a beacon frame 225 transmitted by an AP2 220 of a BSS2, but not a beacon frame 235 transmitted by an AP3 230 of a BSS3, the scanning STA 220 performs buffering that the two BSSs (BSS1 and BSS2) have been discovered from a current channel and moves to another channel. Repeatedly performing this process, the scanning STA 220 performs scanning on every channel within the available channels. Since, the scanning STA 220 needs not to perform scanning on channels identified as not available by WSM, the scanning time can be reduced significantly.

Figures 17, 18:
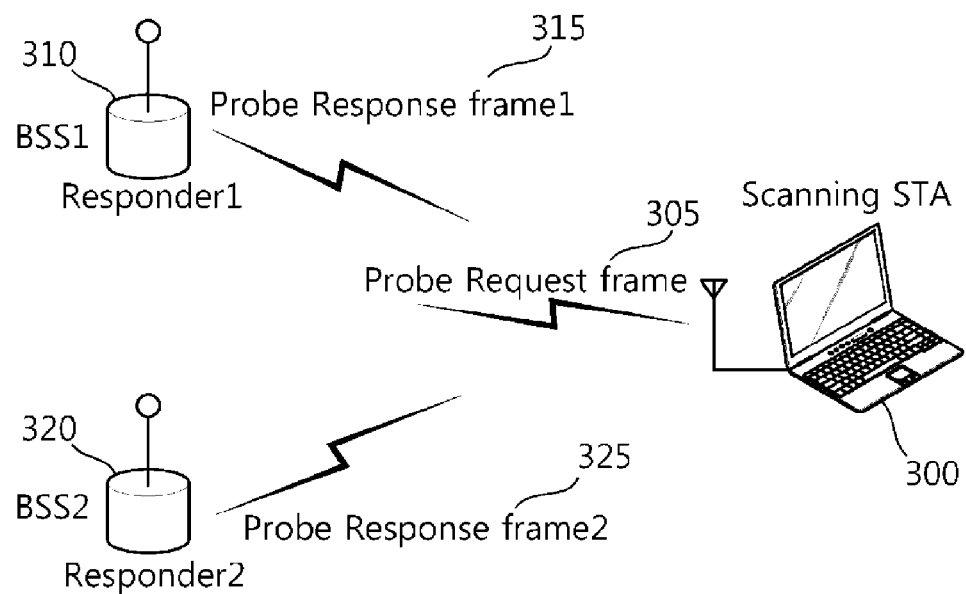
FIG. 18 shows an exemplary channel switch announcement information element structure.

FIG. 17 schematically shows the active scanning scheme according to another embodiment of the present invention.

In the active scanning scheme, the scanning STA transmits a probe request frame, a management frame, transmitted to probe into an AP present nearby while moving each channel on the channel list, and waits for a pertinent response. In present embodiment, the channel list is restricted to the available channel list identified by WSM to reduce the scanning time.

In response to the probe request frame, a responder transmits a probe response frame to the scanning STA. Here, the responder refers to an STA which has finally transmitted a beacon frame in a BSS of a channel which was being scanned. In an infrastructure BSS, an AP transmits a beacon frame, so the AP is the responder, while in an IBSS, STAs within the IBSS transmits a beacon frame by turns, so a responder is not fixed.

With reference to FIG. 17, assume that a scanning STA 300 is a laptop computer equipped with IEEE 802.11 communication module. Also, assume that the scanning STA 300 operates as a dependent STA, which was enabled and receives WSM comprising available channel list in TVWS from an enabling STA or an AP.

When a scanning STA 300 transmits a probe request frame 305, a first responder 310 of the BSS1 and a second responder 320 of the BSS2, which have listened to it, unicast a first probe response frame 315 and a second probe response frame 325 to the scanning STA 300, respectively. Upon receiving the first and second probe response frames 315 and 325, the scanning STA 300 buffers BSS-related information from the received probe response frames, moves to a next channel, and performs scanning on the next channel in the same manner. As stated above, since the scanning STA 300 needs not to perform scanning on channels identified as not available by WSM, the scanning time can be reduced significantly. The probe response frame may further comprise AP's capability information element, HT operation element, EDCA parameter set element, etc.

In summary, one aspect of the present invention proposes the enabling STA to transmit the available channel list in TVWS as WSM to dependent STA(s) via beacon frame or Probe Response frame to reduce the scanning time of the dependent STA. The transmission of WSM can be both periodic and event-triggered.

Further, one embodiment of the present invention proposes that when a STA, receiving WSM, tries to scan AP using available channel list in WSM, the STA does not scan WLAN channel in which whole or part of the TV channel thereof is identified as not available. That is, as explained above, the STA(s) shall operate with first channel granularity (WLAN channel granularity) while the WSM indicates available channel with second channel granularity (available TV channels). Thus, even when a part of one WLAN channel includes TV channel which is not available, that WLAN channel can't be used.

The detailed structure of WSM element and transmission of WSM will be disclosed later. Before this, a mechanism to protect the incumbent user (e.g. DTV) from the operation of the unlicensed device in TVWS according to one aspect of the present invention will be disclosed.

As stated above, the unlicensed device including WS STA should provide a protection mechanism for the incumbent user. That is, if a specific channel is used by an incumbent user, such as wireless microphone, the unlicensed device should stop using this channel. For that purpose, the unlicensed device can perform spectrum sensing to find whether a specific channel is used by a primary user. Spectrum sensing mechanism, which can be used, includes Energy Detection scheme, Feature Detection scheme, etc.

If the unlicensed device finds that the strength of the primary signal is higher than a predetermined level, or if the unlicensed device detects the DTV preamble, the unlicensed device may determine that that channel is used by an incumbent user. And, if the unlicensed device determines on a specific channel that the neighboring channel next to the specific channel is used by the incumbent user, the unlicensed device should lower its transmission power to protect the incumbent user. Therefore, WSM element, according to one embodiment of the present invention, comprises maximum allowed power level information for each of the available channels in WSM.

One embodiment of the present invention is for providing protection mechanism for DTV operating as a primary user in TVWS by sharing the information from the TV sensing of DTV in TVWS with TV band database (TVDB). Specifically, this embodiment proposes using the information collected by DTV in TVWS, because DTV has tuner which can perform sensing TVWS channels, thus DTV can know the channels occupied by DTV broadcasting without accessing TVDB. Further, DTV also can be a TV band device (TVBD) operating in TVWS, thus it can report/broadcast the result of its sensing.

When DTV operates in TVWS, it be more probable that DTV operates as WS STA than as WS AP. Thus, the present embodiment proposes DTV operating as WS STA to report the channel sensing result or measurement report to WS AP, when it processes association with WS AP. By this, WS AP can acquire which of the channels are used for TV broadcasting without accessing TVDB. Even when WS AP has information regarding channels used for broadcasting and/or broadcasting schedule, the WS AP can correctly respond to the mismatch between its own WSM and the report from STA (DTV).

More specifically, DTV (Digital TV), operating as non-AP STA in general, may transmit a channel sensing result frame indicating which of the channels are used for TV broadcasting to AP STA. Then, WS AP should compare this report with WSM acquired from DB access. If there is a channel identified as available by WSM, but this channel is used or scheduled to be used for TV broadcasting, the unlicensed device should not operate on that channel. And, it may update WSM when it receives a measurement report in which a primary service signal is measured on a channel, which is indicated as from the regulatory domain database system.

This mechanism can be used as protection mechanism to protect DTV. When a specific DTV device operates on a specific channel for receiving TV broadcasting signals, and if it detects other WS STA/WS AP operates on that specific channel (if it detects IEEE 802.11af preamble), the DTV device can report/broadcast channel sensing result. And/or, the DTV device may transmit signals asking WS STA/WS AP to stop using that channel. Then, WS STA/WS AP should stop using that channel, and move to another channel.

One example of signals asking WS STA/WS AP to stop using a specific channel is using channel switch announcement information element.

FIG. 18 shows an exemplary channel switch announcement information element structure.

Element ID field may indicates that the present information element (IE) is channel switch announcement information element. Length field may indicate the length of the present IE. Channel Switch Mode field may indicate switching mode of 802.11af STA.

And, when new channel number field of the IE is set to a specific value (e.g, 11111111, 00000000), it can be treated as asking to stop using the present channel. Here, channel switch count is supposed to be set as asking to stop using this channel immediately.

Another example of signals asking WS STA/WS AP to stop using a specific channel is defining and using channel occupancy information element.

FIG. 19 shows an exemplary channel occupancy information element structure.

Element ID field may indicate that the present IE is channel occupancy IE. Length field may indicate the amount of information contained in this IE. The channel number in FIG. 19 may indicate the channel number determined as used by WS STA/WS AP while that channel is used by DTV. If there are multiple channels determined as used by WS STA/WS AP while used by DTV, each channel number of these channels can be included. Thus, the length of this IE is variable.

FIG. 20 shows an exemplary Channel Occupancy Frame structure.

Channel occupancy frame of FIG. 20 is for transmitting channel switch announcement information element of FIG. 18. However, so long as DTV, operating as primary user in TVWS, can protect its operation in TVWS by its measurement report, any frame which can be transmitted to enabling STA including any IE including channel occupancy information element of FIG. 19 can be used.

The above explained mechanism for protecting the incumbent user can be applied to other primary user devices, having sensing ability, other than DTV device.

As stated above, enabling STA shall update WSM, when there is a mismatch between the WSM from DB access and the report from any other STA, and when there is a channel identified as available by WSM, but this channel is used or scheduled to be used for TV broadcasting. And, one embodiment of the present invention proposes the enabling STA to transmit the updated WSM to dependent STA(s), whenever the information from the regulatory domain database is updated, and the enabling STA retrieves the updated available channel information from the DB. The enabling STA can transmit the updated WSM via the above explained beacon frame or probe response frame.

When the enabling STA is non-AP STA, the enabling STA is proposed to transmit the updated WSM via White Space Map Announcement Frame which will be explained below.

Figure 21:
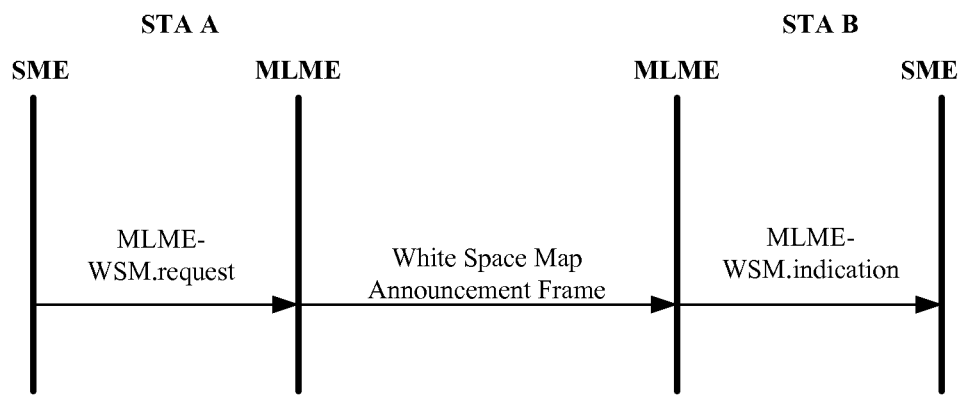
FIG. 21 shows a transmission mechanism of White Space Map announcement Frame between STAs according to one aspect of the present invention.

FIG. 21 shows a transmission mechanism of White Space Map announcement Frame between STAs according to one aspect of the present invention.

In FIG. 21, when STA A transmits White Space Map Announcement frame to STA B to transmit the updated WSM, STA A can be an enabling STA and STA B can be a dependent STA. STA A and STA B may comprise SME (Station Management Entity) and MLME (MAC Layer Management Entity). First, SME of STA A SME may transmit MLME-WSM.request to MLME of STA A. This primitive is for requesting to transmit White Space Map announcement frame to other STA. The MLME-WSM.request may comprise MAC address of STA B and (updated) WSM. MLME of STA A, receiving the MLME-WSM.request, may generate White Space Map announcement frame, and transmit it to MLME of STA B. In this example, the White Space Map Announcement frame generated by MLME of STA A comprises (updated) WSM.

MLME of STA B, receiving White Space Map announcement frame comprising (updated) WSM from MLME of STA A, may indicate this to SME using MLME-WSM.indication. MLME-WSM.indication primitive may comprise MAC address of STA A and (updated) WSM. For the example for WSM update, where enabling STA as non-AP STA updates WSM, STA A is non-AP STA, thus MLME-WSM.indication may comprise address of non-AP STA MAC entity. SME of STA B, receiving MLME-WSM.indication, controls STA B to operate only within the available channels identified by the received WSM.

In summary, the enabling STA can transmit (updated) WSM to a dependent STA via at least one of beacon frame, probe response frame, and White Space Map Announcement frame. When the enabling STA is non-AP STA, the enabling STA may transmit (updated) WSM via White Space Map Announcement frame.

Hereinafter, operation of AP STA as dependent STA is explained.

As explained above, AP STA can be a dependent STA receiving the WSM from an enabling STA. However, the dependent AP STA, according to one embodiment of the present invention, also plays a role for forwarding the received WSM within at least one beacon frame in every beacon transmission instances with a predetermined transmission interval for another dependent STA. Thus, the dependent AT STA can be called as the first type dependent STA while another dependent STA receiving the WSM from the dependent AP STA can be called as the second type dependent STA. Further, when the dependent AP STA receives an updated WSM from an enabling STA, it should operate only within the available channels identified by the updated WSM, since the dependent AP STA is also a dependent STA (the first type dependent STA) operating as an unlicensed device in TVWS. That is, if the dependent AP STA is operating on a channel which becomes unavailable by the updated WSM, the dependent AP STA should move to another channel identified as available according to the updated WSM. Further, the dependent AP STA, according to the present example, shall transmit the updated WSM in a next beacon transmission instance when the WSM is supposed to be transmitted within the beacon frame.

In this example for the dependent AP STA, if the AP STA receives a probe request frame on a specific channel identified by the WSM from the dependent STA (the second type dependent STA), the AP STA shall transmit a probe response frame comprising the WSM to the dependent STA (the second type dependent STA).

Hereinafter, WSM structure according to one aspect of the present invention will be explained.

Figure 22:
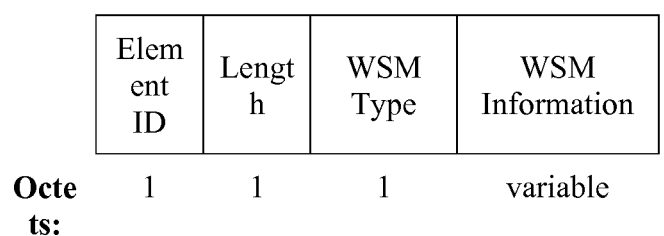
FIG. 22 shows an exemplary structure of WSM element according to one embodiment of the present invention.

FIG. 22 shows an exemplary structure of WSM element according to one embodiment of the present invention.

WSM element comprises available channel list from the regulatory database. Further, as stated above, when the unlicensed device operates on a specific channel which is available in TVWS and the neighboring channel next to the specific channel is used by an incumbent user, the unlicensed device should lower its transmission power to protect the incumbent user. Therefore, one embodiment of the present invention proposes WSM element comprising available channel list and maximum allowed transmission power of the available channels from the regulatory database. Further, as stated above, available channels identified by the WSM can have a first channel granularity, while STAs operating in TVWS use channels having a second channel granularity. Preferably, the WSM element may indicate available TV channels, but channel granularity can be differently set as stated above. In another example of the present invention, the WSM element can indicate unavailable channels instead of available channels, as stated above.

Actual maximum of transmission power level may be decided depending on the channel bandwidth and the maximum allowed transmission powers per available channel. When the operational channel bandwidth (WLAN channel) spans multiple channels indicated in the WSM, whose maximum power levels are different, the operational transmission power level shall be constrained by the minimum transmission power level of those multiple channels, which are indicated in the WSM.

Preferably, as shown in FIG. 22, WSM element may comprise Element ID field, Length field, WSM Type field and WSM Information field.

Element ID field may indicate that this element is White Space Map element. Length field has a variable value in a unit of octet corresponding to the length of WSM. Since the numbers of available channels and corresponding maximum power level values are variable, the length field may indicate the length of WSM element.

WSM type field may indicate the type of WSM information. Specifically, WSM type may indicate whether WSM information is TV Band WSM, or other type of WSM. If WSM type indicates that the present WSM element is TV Band WSM element, this WSM element is a WSM element including the available channel list and the maximum transmission powers allowed for each of the available channels, which was acquired from TV band database by the enabling STA.

According to one example of the present invention, the information in a WSM element is valid for a 'dot11WhiteSpaceMapValidTime' from the transmission of the beacon frame containing WSM element. The value of 'dot11WhiteSpaceMapValidTime' may be predetermined between STAs/APs. If the WSM is invalid, APs are preferred not to transmit a WSM element and preferred not to transmit any signal in the regulatory bands and dependent STAs become unenabled. If an enabled dependent STA does not receive a WSM within dot11WhiteSpaceMapValidTime, it becomes unenabled.

Figure 23:
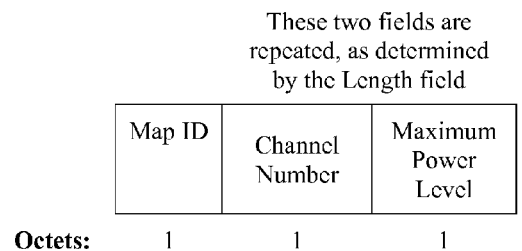
FIG. 23 shows one exemplary structure of TV Band WSM according to an embodiment of the present invention.

FIG. 23 shows one exemplary structure of TV Band WSM according to an embodiment of the present invention.

As shown in FIG. 23, TV Band WSM may comprise MAP ID field, Channel Number field, Maximum Power Level field.

Figure 24:
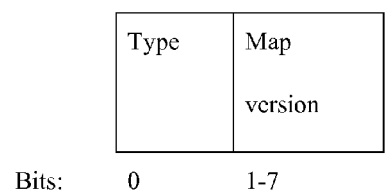
FIG. 24 shows an exemplary format of the Map ID bits.

Map ID field is an identifier of the TV band WSM information field format for a TV band WSM and the format of the Map ID bits is illustrated in FIG. 24.

Referring to FIG. 24, type bit is one bit in length and indicates whether the following channel list is a full channel list or a partial channel list. If the Type bit is set to 1, the following channel list is a full channel list and if the Type bit is set to 0, the following channel list is a partial channel list.

Map version of FIG. 24 may be 6 bits in length and identifies the version of WSM. When the available channel information from the TV band database is updated and the corresponding WSM is updated, then the Map version is circularly incremented by 1 and the default bit value of the Map version is 0000000.

If a STA receives several WSMs with the same Map version and the Type bit is set to 0 (partial WSM), the STA shall construct the whole channel list using the multiple WSMs having the same Map version.

Figure 25:
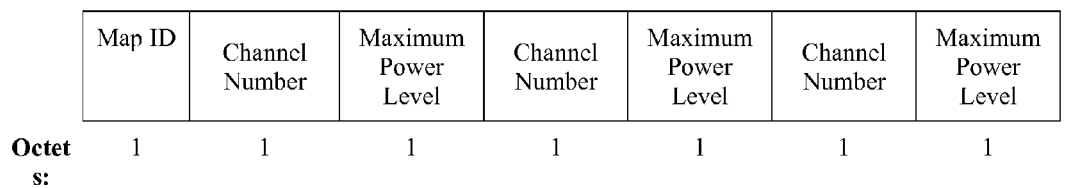
FIG. 25 is an exemplary format of WSM information.

Now, referring back to FIG. 23, the Channel Number field may be a positive integer value that indicates where the TV channel is available for WLAN operation. The length of the Channel Number field may be set as 1 octet. When the Channel Number and Maximum Power Level pairs are repeated (as indicated in FIG. 23), they shall be listed in increasing TV channel numbers. FIG. 25 is an exemplary format of WSM information.

Hereinafter, White Space Map Announcement Frame structure according to one example of the present invention is explained.

Figures 26, 27:
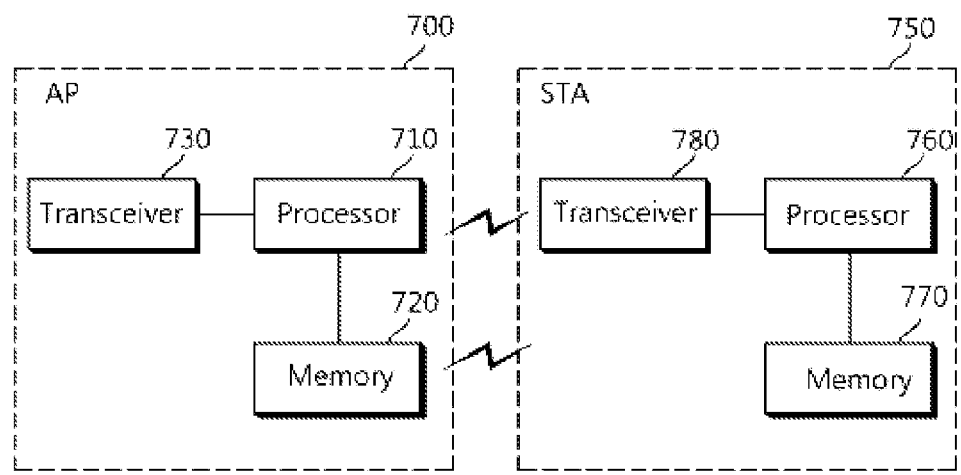
FIG. 26 shows an exemplary White Space Map Announcement Frame structure according to one embodiment of the present invention.
FIG. 27 is a schematic block diagram of wireless apparatuses implementing an exemplary embodiment of the present invention.

FIG. 26 shows an exemplary White Space Map Announcement Frame structure according to one embodiment of the present invention.

The White Space Map Announcement frame may use the Action frame body format as shown in FIG. 26. The Category field may be set to the value for predefined public action defined. The Action field may be set to the value indicating White Space Map Announcement frame. The remaining fields are as defined in the White Space Map element body explained above.

FIG. 27 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 28:
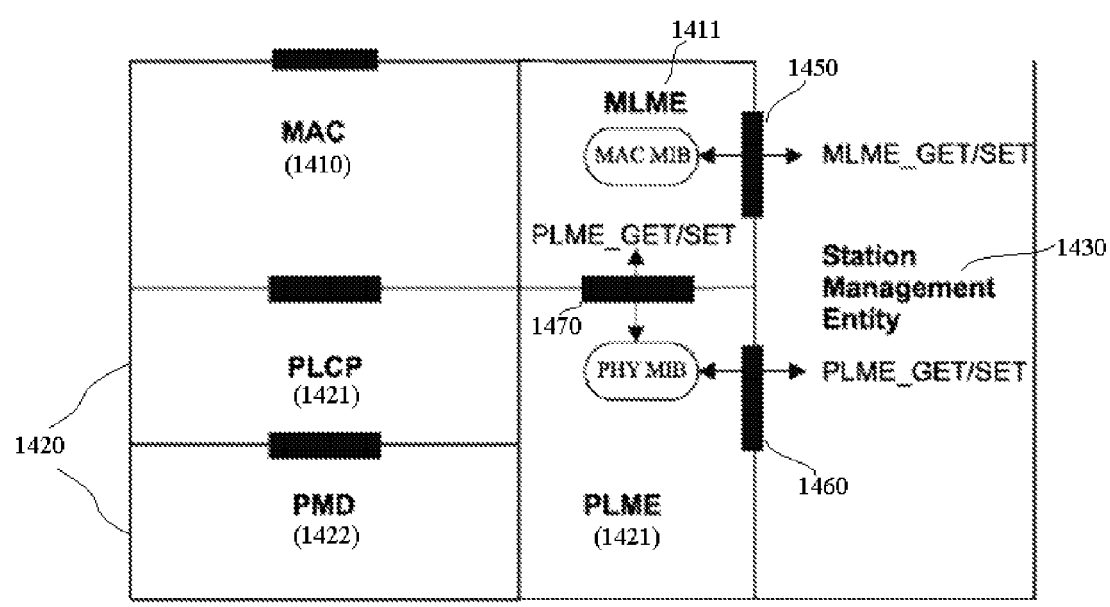
FIG. 28 shows an exemplary structure of processor of STA apparatus according to one embodiment of the present invention.

FIG. 28 shows an exemplary structure of processor of STA apparatus according to one embodiment of the present invention.

Processor 710 or 760 of STA may have multiple layer structures, and FIG. 28 especially focuses on MAC sublayer (1410) on data link layer (DLL) and Physical layer (1420) among these layers. As shown in FIG. 28, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 28 interact in various ways. FIG. 28 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 28, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 28, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

What is claimed is:

1. An apparatus operating as a first station in a wireless local area network (WLAN) system, the apparatus comprising:

a processor comprising:

a MAC sublayer management entity (MLME); and a station management entity (SME); and a transceiver connected to the processor, wherein the SME is configured to transmit a MLME-WSM.request primitive to the MLME, the MLME-WSM.request primitive comprising MAC address of a second station and White Space Map (WSM) information identifying available channels and transmit powers on the available channels, the WSM having a format of White Space Map Element comprising a map identifier, the map identifier indicating whether the WSM is updated or not, and wherein the MLME is configured to transmit a frame comprising the WSM to a MLME of the second station through the transceiver.

2. The apparatus of claim 1, wherein the processor is configured to transmit the WSM to the second station through a frame transmitted with unsolicited manner, when the WSM is updated.

3. The apparatus of claim 1, wherein the apparatus operating as the first station is configured to operate as an enabling station generating the WSM using its own geographic location information and a regulatory database access capability.

4. The apparatus of claim 3, wherein the second station is a dependent station that is configured to be enabled by the enabling station.

5. The apparatus of claim 1, wherein the processor is configured to control the second station to protect a primary user on a specific channel by transmitting an updated WSM directing the second station to move to another channel other than the specific channel.

* * * * *